(12) United States Patent
Riley et al.

(10) Patent No.: US 7,284,138 B2
(45) Date of Patent: Oct. 16, 2007

(54) DEEP POWER SAVING BY DISABLING CLOCK DISTRIBUTION WITHOUT SEPARATE CLOCK DISTRIBUTION FOR POWER MANAGEMENT LOGIC

(75) Inventors: Mack Wayne Riley, Austin, TX (US); Daniel Lawrence Stasiak, Austin, TX (US); Michael Fan Wang, Austin, TX (US); Stephen Douglas Weitzel, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 330 days.

(21) Appl. No.: 11/002,551

(22) Filed: Dec. 2, 2004

(65) Prior Publication Data

US 2006/0123261 A1    Jun. 8, 2006

(51) Int. Cl.
*G06F 1/00* (2006.01)
(52) U.S. Cl. .................. 713/322; 713/310; 713/324
(58) Field of Classification Search ......... 713/300–340
See application file for complete search history.

(56) References Cited

U.S. PATENT DOCUMENTS

| | | | |
|---|---|---|---|
| 5,594,735 A | 1/1997 | Jokura | |
| 6,304,979 B1* | 10/2001 | Bacigalupo | 713/601 |
| 6,434,704 B1* | 8/2002 | Dean et al. | 713/320 |
| 6,694,441 B1 | 2/2004 | Sethia | |
| 6,763,060 B1 | 7/2004 | Knapp | |
| 6,938,176 B1* | 8/2005 | Alben et al. | 713/323 |
| 6,990,165 B2 | 1/2006 | Boerstler et al. | |
| 7,036,032 B2 | 4/2006 | Mizuyabu et al. | |
| 2004/0260960 A1* | 12/2004 | Hilgendorf et al. | 713/320 |

\* cited by examiner

*Primary Examiner*—Thomas Lee
*Assistant Examiner*—Brian Bochicco
(74) *Attorney, Agent, or Firm*—Carr LLP; D'Ann N. Rifai

(57) ABSTRACT

An apparatus, a method, and a computer program are provided to disable clock distribution. In microprocessors, the clock distribution system can account for a substantial amount of power consumption. Disabling the clock distribution system, however, has been difficult because of the usual requirement for a separate clock for control logic. Therefore, combinational logic can be employed to disrupt the clock distribution and allow a processor to be awakened without a need for a separate clock.

6 Claims, 2 Drawing Sheets

DEEP POWER SAVING BY DISABLING CLOCK DISTRIBUTION WITHOUT SEPARATE CLOCK DISTRIBUTION FOR POWER MANAGEMENT LOGIC

CROSS-REFERENCED APPLICATIONS

This application relates to co-pending U.S. patent applications entitled "A METHOD TO GATE OFF PLLS IN A DEEP POWER SAVING STATE WITHOUT SEPARATE CLOCK DISTRIBUTION FOR POWER MANAGEMENT LOGIC" (Ser. No. 11/002,559), filed concurrently herewith.

FIELD OF THE INVENTION

The present invention relates generally to clocking distribution, and more particularly, to clock distribution gating in a microprocessor.

DESCRIPTION OF THE RELATED ART

In conventional microprocessors, power consumption control has been evolving. Within microprocessors, there are three types of phenomenon that result in power consumption: direct current (DC) leakage, the clock, and alternating current (AC) usage. DC leakage is a product of the devices themselves losing charge when the system is powered. For example, thin film capacitors within a microprocessor will lose charge due to a leakage current. The clocking distribution system, mesh, or tree consumes power due the constant toggling that occurs, and the AC usage is the switching power required for active switching of the logic in the microprocessor.

Because of temperature requirements, limitations of power sources, limitations of the device, as well as other factors, there is a constant strived-for reduction in the power consumption of the microprocessors. These power reduction solutions have taken many different forms. For example, disengaging entire sections of logic on the microprocessor when not in use for extended periods of time is often employed. Also, improving the quality with which the microprocessors are manufactured is employed.

However, several techniques have been employed to reduce power consumption by the clocking distribution system. The clocking distribution system can often consume 15% or more of the total chip power. Therefore, it would be desirable to gate off the clocking distribution when the processor is in a deep power saving mode. However, pervasive logic controlling the gating of the clock distribution requires a clock to operate. Some conventional solutions utilize a separate clock for the control logic so that the control logic functions while the main clock distribution is gated off.

Having a separate clock for the control logic, however, has several drawbacks. Designing such a clocking system is difficult, requiring many man-hours. Control logic is limited to the separate clock distribution physical boundary, making integration difficult. Additionally, the separate clock distribution may be asynchronous to the main clock mesh, creating difficulty for signals crossing the synchronous-asynchronous boundary.

Therefore, there is a need for a method and/or apparatus for reducing power consumption by a clock distribution system the addresses at least some of the problems associated with conventional solutions.

SUMMARY OF THE INVENTION

The present invention provides a method and computer program for disabling clock distribution while a processor is in power save mode. A plurality of power mode signals is generated. Then, based on the plurality of power mode signals, the clock distribution to the processor is disrupted.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combinations thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
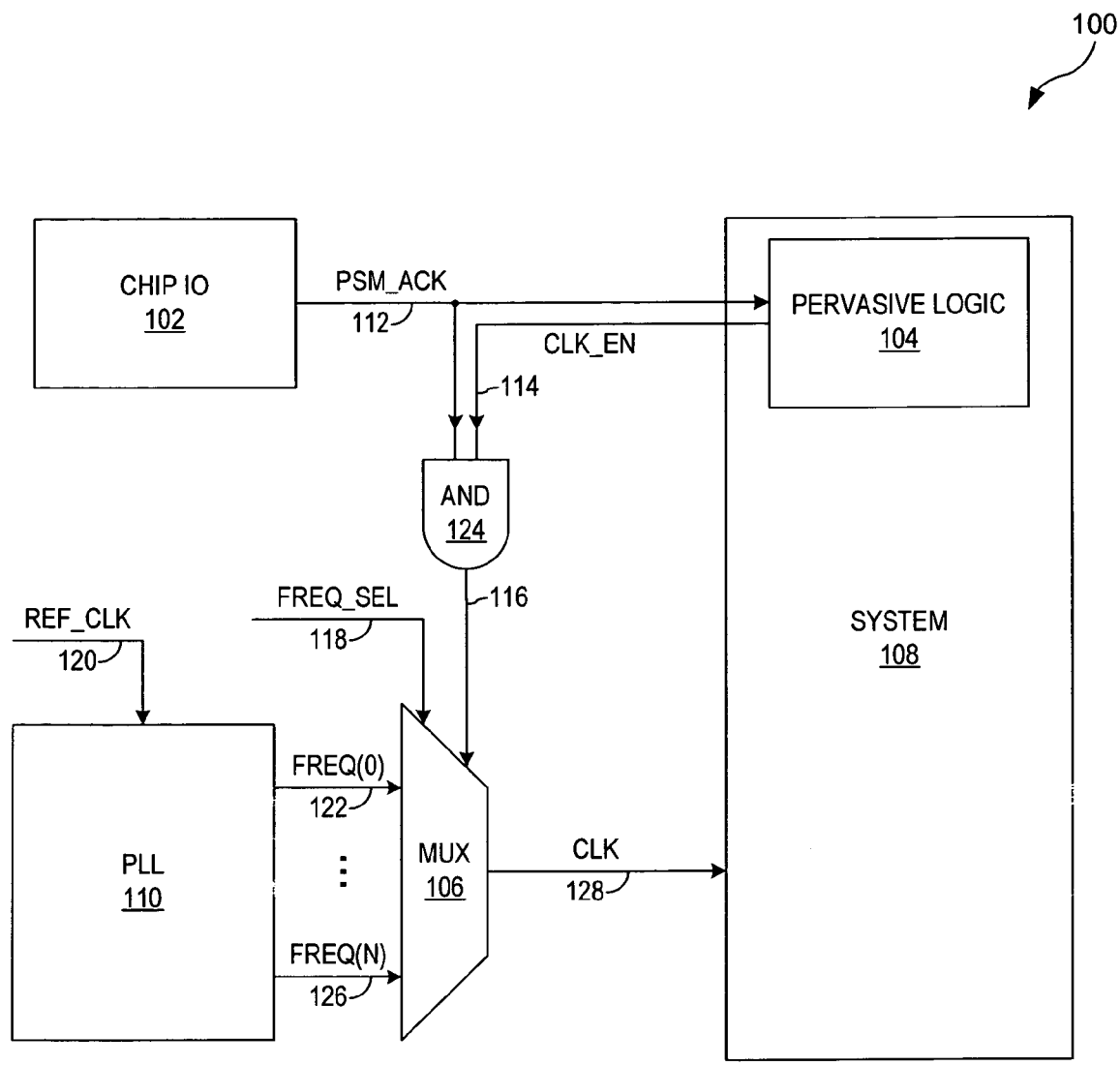
FIG. 1 is a block diagram chip that employs a clock gating system.

Referring to FIG. 1 of the drawings, the reference numeral 100 generally designates a chip that employs a clock gating system. The chip 100 comprises a chip IO 102, a phased locked loop (PLL) 110, a multiplexer (mux) 106, an AND gate 124, and a system 108.

For the chip 100 to function, the PLL 110 can apply one of several frequency clocking signals to the system 108. The PLL 110 receives a reference clock signal (REF_CLK) through the communication channel 120 and generates a plurality of output clocking signals FREQ(0) to FREQ(n). The PLL 110 transmits the clocking signals to the mux 106 through the communication channels 122 and 126. However, for each clocking frequency generated by the PLL 110, there is a designated communication channel for each frequency, but only two communication channels are depicted for the purposes of illustration. Then one of the frequencies output from the PLL 110 is selected by virtue of the frequency select (FREQ_SELLS) signal into the mux 106 through the communication channel 118. The mux can then output a clocking signal (CLK) to the system 108 through the communication channel.128.

The CLK, however, can be gated off due to the outputs from the Chip IO 102 and the pervasive logic 104 of the system 108. The Chip IO 102 outputs a power save mode acknowledge (PSM_ACK) to the AND gate 124 through the communication channel 112. The PSM_ACK signal is typically related through the Chip IO 102 from an external device. Additionally, the pervasive logic 104 outputs a clock enable signal (CLK_EN) signal to the AND gate 124 through the communication channel 114. Under circumstances when PSM_ACK and CLK_EN are logic high, then a disable signal is transmitted to the mux 106 through the communication channel 116. The disable signal disables the mux 106 so that no clocking signal is transmitted to the system 108.

Figure 2:
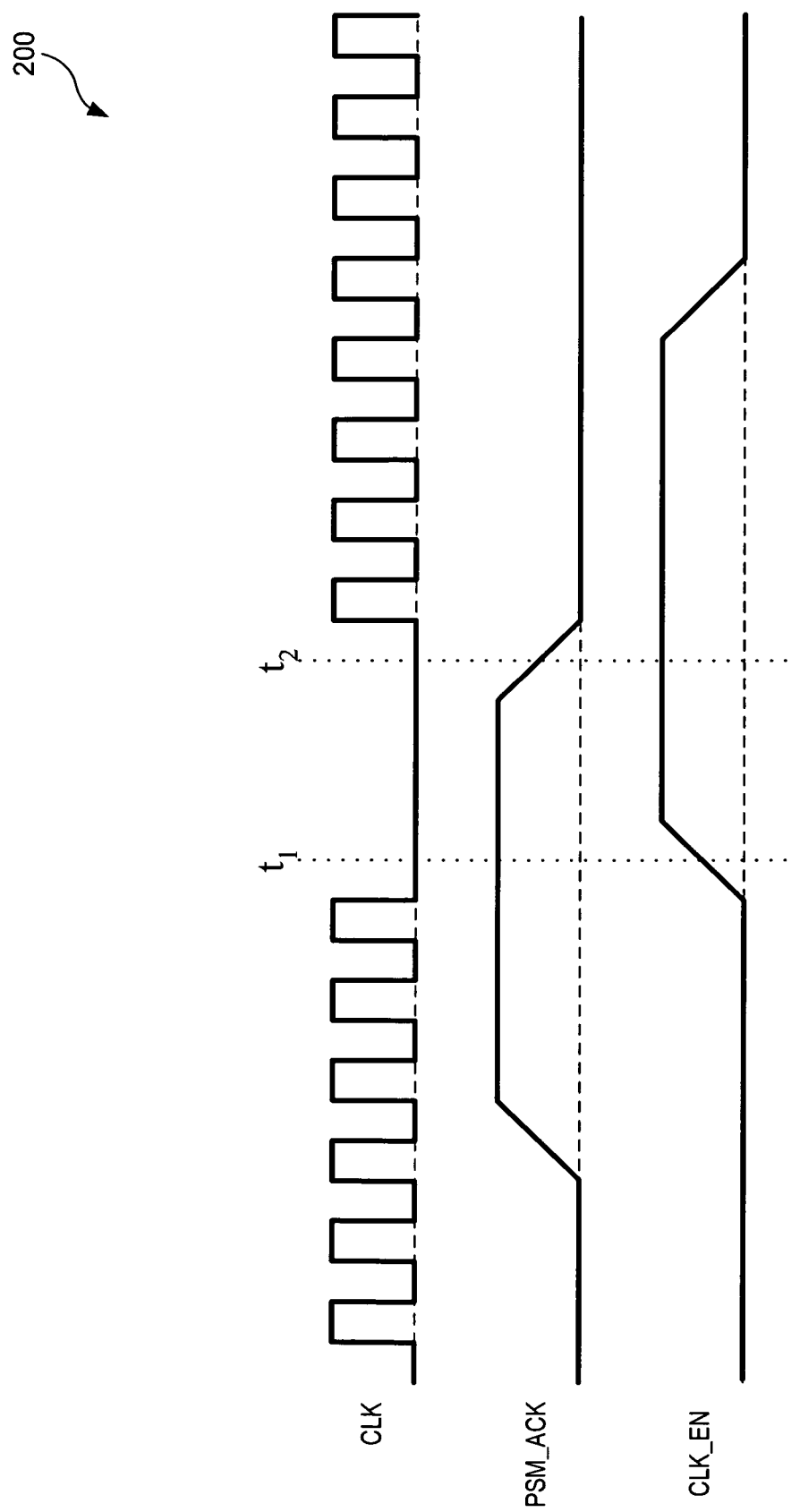
FIG. 2 is a timing diagram depicting the operation of the clock gating system.

The operation of the system, however, can be illustrated through a timing diagram. Referring to FIG. 2 of the drawings, the reference numeral 200 generally designates a timing diagram depicting the operation of the clock gating system.

During normal operation, CLK toggles as normal. At ti, however, the CLK is disabled. Prior to $t_1$, PSM_ACK transitions to logic high. Due to the use of the AND gate 124, though, the PSM_ACK signal is not determinative. It is not until $t_1$, when CLK_EN transitions to logic high, that CLK is disabled. Then, at $t_2$, PSM_ACK transitions back to logic low, causing CLK to be enabled once again.

Specifically, the operation of the clock gating system is employed during a power save mode. Within this mode the clock distribution is shut down. Then, reactivation occurs as a result of an external handshake signal(s) that "wakes up" the processor. These handshake signals are level sensitive signals that are monitored while the processor is in power saving mode. Within the configuration of the chip 100 of FIG. 1, the handshake signals are monitored with static (combinational) logic instead of a separate clock distribution. Therefore, clock distribution that is not utilized can be disabled without having to employ a separate clock distribution.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. An apparatus, comprising:
   a system logic unit coupled to receive a clock (CLK) signal and a power save mode acknowledge (PSM_ACK) signal, wherein the PSM_ACK signal is asserted in a power saving mode, and wherein the system logic unit is configured to perform a function dependent upon the CLK signal and to produce a clock enable (CLK_EN) signal in response to the PSM_ACK signal;
   enable logic coupled to receive the PSM_ACK signal and the CLK_EN signal, and configured to selectively produce one of a MUX enable signal and a MUX disable signal dependent upon a selected combination of the PSM_ACK signal and the CLK_EN signal;
   a multiplexer (MUX) coupled to the enable logic and configured to receive the MUX enable signal and to select one of a plurality of PLL frequency inputs, and to generate a CLK signal in response to the selected one of a plurality of PLL frequency inputs and the MUX enable signal; and
   a phased locked loop (PLL) unit coupled to the MUX and a reference clock (REF_CLK) signal, and configured to use the REF_CLK signal to produce the plurality of PLL frequency inputs to the MUX.

2. The apparatus of claim 1, wherein the apparatus is a processor.

3. The apparatus of claim 1, wherein the system logic unit comprises pervasive logic coupled to receive the PSM_ACK signal and configured to produce the CLK_EN signal in response to the PSM_ACK signal.

4. The apparatus of claim 1, wherein the enable logic is configured to deassert the MUX enable signal in the event the PSM_ACK signal is asserted and the CLK_EN signal is asserted.

5. The apparatus of claim 1, wherein the enable logic comprises an AND logic gate.

6. A method for selectively producing a clock (CLK) signal, comprising:
   receiving a power save mode acknowledge (PSM_ACK) signal and responding to the PSM_ACK signal by producing a clock enable (CLK_EN) signal, wherein the PSM_ACK signal is asserted in a power saving mode;
   receiving the PSM_ACK signal and the CLK_EN signal and using a selected combination of the received PSM_ACK and CLK_EN signals to selectively produce one of a MUX enable signal and a MUX disable signal;
   receiving a reference clock (REF_CLK) signal and using the REF_CLK signal to produce a plurality of phased lock loop (PLL) signals;
   selecting one of the plurality of PLL signals in response to a frequency select (FREQ_SEL) signal; and
   generating a clock signal (CLK) based on the selected one of the plurality of PLL signals and the MUX enable signal.

* * * * *